United States Patent [19]

Fuehrer

[11] Patent Number: 4,756,212

[45] Date of Patent: Jul. 12, 1988

[54] PLANET GEAR CARRIER ASSEMBLY

[75] Inventor: Reece R. Fuehrer, Danville, Ind.

[73] Assignee: General Motors Corporation, Detroit, Mich.

[21] Appl. No.: 2,376

[22] Filed: Jan. 12, 1987

[51] Int. Cl.⁴ ............................................. F16H 3/44
[52] U.S. Cl. ................................... 74/750 R; 74/467
[58] Field of Search ............... 74/750 R, 467, 762, 74/763, 789; 403/326

[56] References Cited

U.S. PATENT DOCUMENTS

| | | | |
|---|---|---|---|
| 2,472,788 | 6/1949 | Burrus | 74/750 R |
| 2,968,190 | 1/1961 | Orr | 74/467 |
| 3,055,237 | 9/1962 | Magnuson | 74/750 R X |
| 3,131,582 | 5/1964 | Kelbel | 74/467 X |
| 3,279,835 | 10/1966 | Krohm | 403/326 |
| 3,531,144 | 9/1970 | Bizilla | 403/326 |
| 3,539,035 | 11/1970 | Wolkenstein | 74/467 X |
| 3,888,597 | 6/1975 | Datta | 403/326 |
| 4,189,960 | 2/1980 | Holdeman | 74/750 R X |
| 4,214,489 | 7/1980 | Ahlen et al. | 74/750 R X |
| 4,405,251 | 9/1983 | Kolchinsky et al. | 403/326 X |
| 4,459,869 | 7/1984 | Bucksch | 74/467 |
| 4,480,492 | 11/1984 | Fujioka et al. | 74/467 |

FOREIGN PATENT DOCUMENTS

| | | | |
|---|---|---|---|
| 2327566 | 1/1974 | Fed. Rep. of Germany | 403/326 |
| 38249 | 2/1986 | Japan | 74/750 R |

Primary Examiner—Leslie A. Braun
Assistant Examiner—Dwight G. Diehl
Attorney, Agent, or Firm—Donald F. Scherer

[57] ABSTRACT

A planet gear carrier assembly has a cage in which is rotatably mounted a plurality of pinion gears. Each gear is mounted on a respective spindle which is disposed in aligned bores formed in the sidewalls of the cage. In one sidewall, the bores have a stepped diameter to limit longitudinal movement of the spindles in one direction. A flat machined on each spindle and a locking ring, secured in a groove in the other sidewall limit longitudinal movement of the spindles in the other direction as well as rotary movement of the spindles. In one embodiment, an oil shield or lube directing ring is positioned by the locking ring and the spindle flat to direct lubrication fluid to lube passages formed in the spindles.

2 Claims, 1 Drawing Sheet

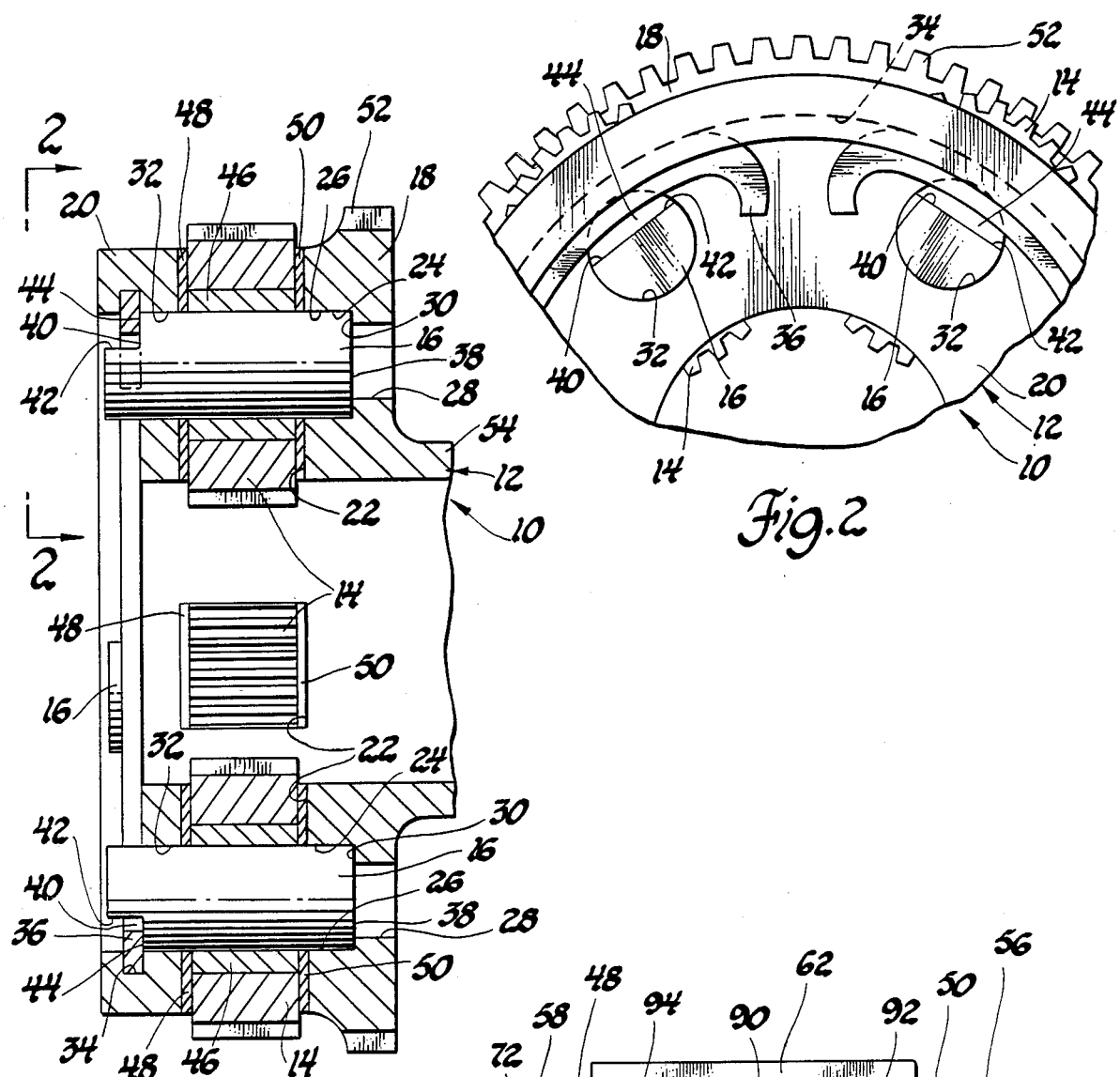
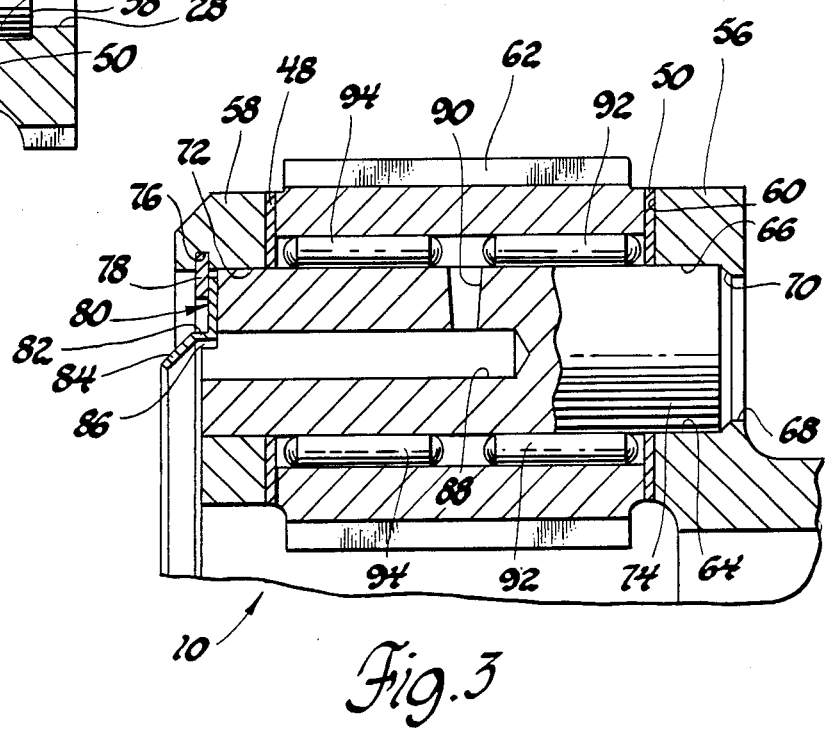
Fig.1
Fig.2
Fig.3

PLANET GEAR CARRIER ASSEMBLY

BACKGROUND OF THE INVENTION

This invention relates to gear assemblies and more particularly to planetary gear carrier assemblies.

Planetary carrier assemblies have generally been designed to either permit rotation of the spindles for the pinion gears or to prevent rotation thereof. When it was desirable to prevent the rotation of the spindles, these items were generally welded or staked in the carrier cage member to prevent the rotation. While the use of these manufacturing techniques is effective to prevent rotation, they do, as a general rule, prevent repair to the carrier assembly without significant reworking.

SUMMARY OF THE INVENTION

The present invention seeks to overcome this drawback by making it possible to easily remove the spindles from a planet carrier assembly so that repair to either the spindles, gears or bearings may be easily accomplished. After repair, reassembly of the planet carrier does not require special assembly equipment.

It is therefore, an object of this invention to provide a planet carrier assembly wherein the planet gears are rotatably mounted on spindles which are disposed in the planet carrier and wherein the planet carrier has a pair of spaced sidewalls one of which has a stepped diameter bore and the other has a single diameter bore in which the spindle is assembled and also wherein the spindle has a flatted section which cooperates with a locking ring secured in one sidewall such that longitudinal and rotary displacement of the spindle is prevented.

It is another object of this invention to provide an improved planet carrier assembly wherein the spindles on which the planet gears are rotatably mounted are disposed in bores formed in the planet carrier having a stepped diameter at one end thereof and further wherein a locking ring is secured in a groove formed in the carrier longitudinally displaced from the stepped diameter portion and cooperating with a flatted portion and an oil shield to secure the spindle within the stepped diameter thereby limiting both longitudinal and rotational displacement of the spindle and providing for the directing of a lubrication fluid to a centrally disposed lube passage formed in the spindle.

These and other objects and advantages of the present invention will be more apparent from the following specification and drawings.

DESCRIPTION OF THE DRAWINGS

FIG. 1 is a cross-sectional elevational view of a planet carrier assembly.

FIG. 2 is a view taken along line 2—2 of FIG. 1.

FIG. 3 is an enlarged cross-sectional elevational view of a portion of a planet carrier assembly incorporating another embodiment of the invention.

DESCRIPTION OF THE EMBODIMENTS

Referring to the drawings, wherein like characters represent the same or corresponding parts throughout the several views, there is seen in FIG. 1 a planet carrier assembly 10 which includes a cage 12, a plurality of pinion gears 14, and a plurality of spindles 16 each rotatably supporting a pinion gear 14.

The cage 12 has a pair of sidewalls 18 and 20 which can be either formed integrally or secured together by a plurality of fasteners. For purposes of this disclosure, the sidewalls will be considered as integrally formed. In either event, the sidewalls 18 and 20 are spaced to provide a plurality of spaces 22 in which are disposed the gears 14. The sidewall 18 has a stepped diameter bore 24 comprised of a large diameter 26 and a small diameter 28 which are joined by a shoulder section 30.

The sidewall 20 has a single diameter bore 32 which is formed coaxially with the stepped diameter bore 24 and is preferably of the same diameter as the large diameter 26. Also formed in the sidewall 20 is a groove 34 which entraps or otherwise cooperates with a locking ring 36.

The spindles 16 are disposed in the single diameter bore 32 and the large diameter 26 of stepped diameter bore 24. The spindles are preferably a line-to-line fit or a light press fit with the bores 32 and 24. Each spindle has an end 38 which abuts the shoulder 30 to limit the axial movement of the spindles in the rightward direction as viewed in FIG. 1. The other end of spindles 16 have a cutout portion 40 which results in both a longitudinal flat surface 42 and a radially extending flat surface 44.

The flat surface 44 is in axial abutment with the locking ring 36 such that axial movement of the spindles 16 in the leftward direction is limited. The longitudinal flat surface 42 is disposed in close proximity with the inner surface of the locking ring 36 to thereby limit the rotational displacement of the spindles 16. The clearance between the flat surface 42 and the inner surface of the locking ring 36 is sufficient to permit installation of the locking ring 36 in the groove 34.

Each spindle 16 has disposed thereon a bearing 46 which permits the pinion gear 14 to rotate freely. Also disposed in the openings 22 are a pair of thrust bearings 48 and 50 which support the axial forces imposed on the pinion gears 14 during operation in a planetary gear arrangement.

The bearing structures and thrust washer structures are very well known and utilized in most planetary gear systems. As is well-known in planetary gear systems, the pinion gears 14 will mesh with both a sun gear and a ring gear so as to provide a complete planetary gear arrangement.

In such arrangements, it is desirable to either restrain the carrier from rotation or to secure it to a rotating member for simultaneous rotation therewith. The carrier assembly 10 therefore, includes a spline 52 disposed on the outer surface of sidewall 18 which might be connected with a conventional friction clutch or brake member or with a toothed hub which in turn would be secured to another element within the planetary transmission. In the alternative, the spline 52 can be eliminated and connection to the carrier assembly 10 can be made by way of a hub portion 54 which is formed on the sidewall 18. Or connections can be made at both spline 52 and hub portion 54.

In FIG. 3 there is seen an alternative embodiment of the planet carrier assembly 10. This assembly 10 also has sidewalls 56 and 58 which are spaced to provide openings 60 in which are disposed pinion gears 62. The sidewall 56 has a stepped diameter bore 64 in which the large diameter 66 and small diameter 68 are connected by an angled or beveled surface 70. The sidewall 58 has a single diameter bore 72 coaxial with the stepped diameter 64 such that a spindle 74 is supported in the diameters 72 and 64.

The sidewall 58 has a locking ring groove 76 in which is disposed a locking ring 78. The locking ring 78 in turn positions an oil shield or lube directing ring 80 which has an annular wall portion 82 and a funnel or frusto-conical portion 84. The annular wall portion 82 is disposed adjacent a longitudinal flat 86 which is formed on the spindle 74.

Spindle 74 has a central fluid passage 88 which extends from the left end thereof to a point approximately one-half the length of the spindle. One or more radial passages, such as 90, communicate fluid in the central passage 88 with the outer surface of the spindle 74. Between the outer surface of the spindle 74 and the pinion gear 62 are disposed a plurality of needle or roller bearings 92 and 94. Lubrication for these bearings is provided by oil distributed through the cooperation of the oil shield 80 and the passages 88 and 90.

During operation of the carrier assembly, lubrication fluid is splashed or otherwise propelled radially outward from lubrication ports, not shown, by rotating members such as shafts and gears. This outwardly propelled fluid is collected by the oil shield 80 and directed into the passage 88 from which it is dispensed through passage 90 to the bearings 92 and 94.

The stepped diameter bore 64 limits the longitudinal movement of the spindle 74 in the rightward direction as viewed in FIG. 3 while the oil shield 80 cooperates with the left end of the spindle 74 and the longitudinal flat portion 86 to limit both leftward movement of the spindle 74 and rotational displacement thereof.

The assembly 10 of FIG. 3 also utilizes thrust bearings 48 and 50 similar to those used with the assembly of FIG. 1. The use of needle bearings, as shown in FIG. 3, rather than a bushing, as shown in FIG. 1, necessitates the positive lubrication bearing mechanism shown in FIG. 3.

Both lubrication and movement limitations are provided through the cooperation of the oil shield 80 and locking ring 76. It should be appreciated that either the assembly of FIG. 1 or FIG. 3 is easily disassembled by removal of the respective locking rings 36 and 76 after which light pressing of the spindles 16 and 74 will permit removal of the pinion gears and the respective bearings.

The assemblies may be reassembled utilizing the same spindles and locking rings while worn parts, such as bearings, thrust washers and gears may be replaced. There are no special tools required other than a pair of pliers and a bench press for the disassembly and reassembly of planet carrier assemblies utilizing the present invention.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A planet gear carrier assembly comprising: a planet cage having spaced sidewalls; a plurality of spindle bores formed in said sidewalls with each bore having a constant diameter portion through one of said sidewalls and a stepped diameter portion in said other sidewall, said constant diameter portion and said stepped diameter portion being coaxial; a spindle disposed in each of said bores, said spindles being limited in axial movement in one longitudinal direction by said stepped diameter portion; a cutout portion having a longitudinally extending surface and a radially extending surface which is disposed perpendicular to the longitudinally extending surface formed on each of said spindles at one end thereof adjacent said constant diameter portion; a groove formed in said one sidewall; retaining ring means disposed in said groove and extending radially inward in close proximity with said cutout portion and cooperating with said longitudinally extending surface for limiting the extent of rotary movement of said spindles and for cooperating with said radially extending surface limiting the axial movement of said spindle in the other longitudinal direction; and gear means rotatably disposed on each of said spindles.

2. A planet gear carrier assembly comprising: a planet cage having spaced sidewalls; a plurality of spindle bores formed in said sidewalls with each bore having a constant diameter portion through one of said sidewalls and a stepped diameter portion in said other sidewall, said constant diameter portion and said stepped diameter portion being coaxial; a spindle disposed in each of said bores, said spindles being limited in axial movement in one longitudinal direction by said stepped diameter portion and each said spindle including a cutout portion having a longitudinally extending wall and a radially extending wall perpendicular to the longitudinally extending wall and a centrally disposed lubrication passage; a groove formed in said one sidewall; retaining means including an oil shield means and locking means, said locking means being disposed in said groove and said oil shield means extending radially inward in close proximity with said cutout portion and said oil shield means including a circumferentially extending wall cooperating with said longitudinally extending wall for limiting the extent of rotary movement of said spindles, a radially extending annular portion cooperating with said radially extending wall for limiting the axial movement of said spindle in the other longitudinal direction and frusto-conical portion for directing fluid to said lubrication passage; and gear means including bearing means disposed on each of said spindles.

* * * * *